US012272368B2

(12) United States Patent
Sha et al.

(10) Patent No.: US 12,272,368 B2
(45) Date of Patent: Apr. 8, 2025

(54) ADAPTIVE NOISE SUPPRESSION FOR VIRTUAL MEETING/REMOTE EDUCATION

(71) Applicant: EMC IP Holding Company LLC, Hopkinton, MA (US)

(72) Inventors: Danqing Sha, Shanghai (CN); Amy N. Seibel, Newton, MA (US); Eric Bruno, Shirley, NY (US); Zhen Jia, Pudong (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 95 days.

(21) Appl. No.: 17/446,547

(22) Filed: Aug. 31, 2021

(65) Prior Publication Data

US 2023/0066600 A1 Mar. 2, 2023

(51) Int. Cl.
*G10L 21/0216* (2013.01)

(52) U.S. Cl.
CPC ................................ *G10L 21/0216* (2013.01); *G10L 2021/02166* (2013.01)

(58) Field of Classification Search
CPC ....... G10L 21/0216; G10L 2021/02166; G10L 25/51; G10K 15/08; G10K 11/16; H04R 1/406
See application file for complete search history.

(56) References Cited

U.S. PATENT DOCUMENTS 8,958,571 B2 * 2/2015 Kwatra ................... H04M 1/20 381/313
9,082,387 B2 * 7/2015 Hendrix ........... G10K 11/17854
9,986,360 B1 5/2018 Aas et al.
10,347,233 B2 * 7/2019 Park ................. G10K 11/17857
10,692,518 B2 * 6/2020 Sereshki ................. G10L 15/08
10,922,484 B1 2/2021 Pereira et al.
10,986,437 B1 * 4/2021 Pan ........................ H04R 1/326
11,234,073 B1 * 1/2022 Xu ................... G10K 11/17857
11,245,993 B2 * 2/2022 Andersen ................ G10L 25/51
11,404,073 B1 * 8/2022 Zhang ................. G10L 21/0216
11,523,244 B1 * 12/2022 Meade ................... H04R 3/005
11,617,044 B2 * 3/2023 Carlile ...................... H04S 7/30 381/313
2017/0150256 A1 * 5/2017 Christoph ........... G10L 21/0364
(Continued)

FOREIGN PATENT DOCUMENTS

EP 3809410 A1 * 4/2021 ........... G06K 9/0051

OTHER PUBLICATIONS

B. Shilpa, Balaji Hariharan , G. Uma, Echo cancellation in a virtual classroom environment, 2015, IEEE, 2015 Asia Pacific Conference on Multimedia and Broadcasting, pp. 40-45 (Year: 2015).*

*Primary Examiner* — Paras D Shah
*Assistant Examiner* — Nadira Sultana
(74) *Attorney, Agent, or Firm* — Workman Nydegger

(57) ABSTRACT

One example method includes performing sound quality operations. Microphone arrays are used to cancel background noise and to enhance speech. With arrays at each environment of each user participating in a call, a first microphone array can cancel or suppress background noise and a second array can generate enhanced speech for transmission to other users. Thus, for user, the audio signal output by the user's device includes an anti-noise signal to cancel background noise present in the user's environment and enhanced speech from other users.

19 Claims, 5 Drawing Sheets

(56) References Cited

U.S. PATENT DOCUMENTS

| | | | |
|---|---|---|---|
| 2019/0008074 | A1 | 1/2019 | Chen |
| 2019/0028803 | A1* | 1/2019 | Benattar ................. H04S 7/304 |
| 2019/0304431 | A1 | 10/2019 | Cardinaux et al. |
| 2019/0326989 | A1 | 10/2019 | McElveen |
| 2020/0145753 | A1* | 5/2020 | Rollow, IV ............ H04R 1/406 |
| 2021/0136127 | A1 | 5/2021 | Ghanaie-Sichanie et al. |
| 2022/0060812 | A1* | 2/2022 | Ganeshkumar .. G10K 11/17815 |
| 2022/0060822 | A1* | 2/2022 | Chng ..................... H04R 3/005 |
| 2022/0114995 | A1* | 4/2022 | Kuthuru .............. G10L 21/0208 |
| 2022/0142600 | A1 | 5/2022 | Tefft et al. |
| 2022/0236946 | A1 | 7/2022 | Khosrowpour et al. |

* cited by examiner

ADAPTIVE NOISE SUPPRESSION FOR VIRTUAL MEETING/REMOTE EDUCATION

FIELD OF THE INVENTION

Embodiments of the present invention generally relate to noise suppression or noise cancelation. More particularly, at least some embodiments of the invention relate to systems, hardware, software, computer-readable media, and methods for audio quality operations including adaptively suppressing noise.

BACKGROUND

One of the ways that people in different locations communicate is conference calls. A conference call today, however, are distinct from conference calls of the past. Conference calls, as used herein, can include any number of participants. Further the conference call may be audio only, video and audio, or the like. Many of the applications for conference calls include additional features such as whiteboards, chat features, and the like. These types of calls (also referred to as online meetings, video conferences, webinars, zoom meeting) have many forms with varying characteristics.

However, noise is often a problem and impacts at least the audible aspect of conference calls. Noise, as used herein and by way of example only, generally refers to unwanted signals (e.g., background noise) that interfere with a desired signal (e.g., speech). For instance, a radio playing in the background of a first user's environment may interfere with the ability of that first user to hear incoming audio. The same radio may be inadvertently transmitted along with the first user's voice and impact the ability of a remote user to clearly hear the first user. In both cases, noise that is local to a user and noise that is remote with respect to the same user can impact the audio quality of the call and impact the ability of all users to fully participate in the call.

Today, there are many opportunities to use these types of calls. Many people are working remotely. Students are also learning remotely. This increased usage has created a need to ensure that workers, students, and others have good sound quality.

However, current methods for reducing noise are often unsatisfactory. For example, conventional digital signal processing (DSP) algorithms may be able to classify a signal as speech, music, noise, or other sound scene and may be able to suppress this noise. Even assuming that DSP algorithms are useful for stationary noises, these algorithms do not function as well with non-stationary noises. As a result, these algorithms to not scale or adapt to the variety and variability of noises that exist in an everyday environment.

Beamforming is a technique that allows a speaker's speech to be isolated. However, this technique degrades in situations where there are multiple voices in the same room. Further, beamforming techniques do not suppress reverberation or other noise coming from the same direction. In fact, beamforming does not necessarily mask larger noises in the environment.

Some solutions, such as headphones, may provide some improvement. However, headphones are often uncomfortable, particularly when worn for longer periods of time, and impede the user in other ways. There is therefore a need to improve sound quality and/or user comfort in these types of calls and environments.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to sound quality and sound quality operations including adaptive noise suppression or noise reduction. More particularly, at least some embodiments of the invention relate to systems, hardware, software, computer-readable media, and methods for improving sound quality by actively reducing noise in an environment. Embodiments of the invention further relate to improving sound quality for a user with respect to noise from the user's environment and noise from the environment of other remote users communicating with the user. Thus, embodiments of the invention both improve the sound quality of audio received from remote users while also improving the sound quality by suppressing or reducing the impact of noise in the user's environment.

Figure 1A:
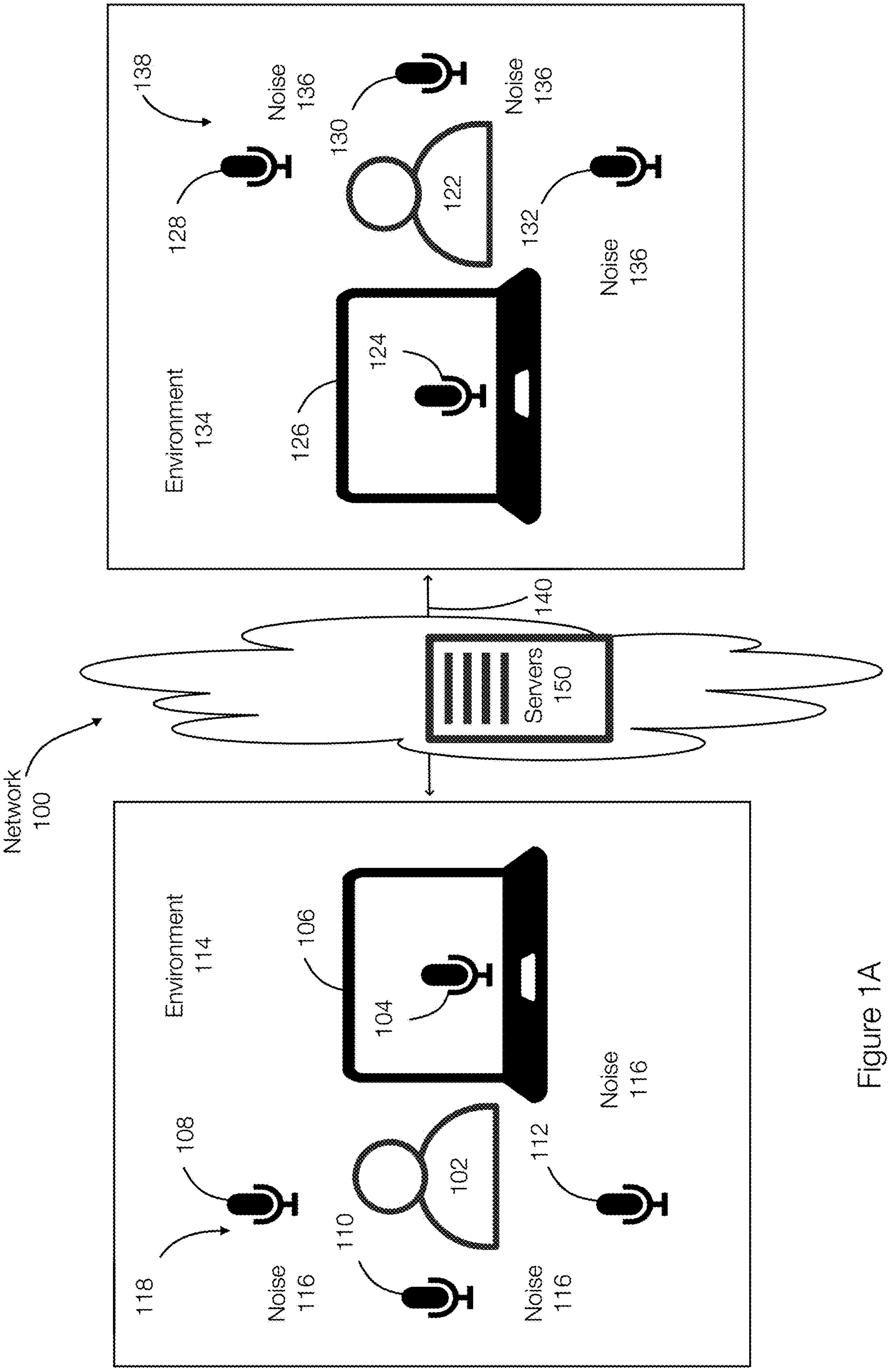
FIG. 1A discloses aspects of a microphone array deployed in an environment and configured to suppress unwanted noise signals.

FIG. 1A illustrates an example of an environment in which sound quality operations are performed. FIG. 1A illustrates a user 102 and a user 122 that are participating in a call 140 over a network 100. The call 140 includes at least an audio component and may also include other components such as a video component, a text component, a whiteboard component, or the like or combination thereof. The audio component may be transmitted over a network 100 using any suitable protocol.

The user 102 is present in an environment 114 that includes noise 116. The noise 116 may emanate from multiple sources including stationary sources or non-stationary sources. The noise may include general background noise and may also include speech of other persons. Background noise may include, but is not limited to, other voices, external noise (e.g., street noise), music, radio, television, appliances, or other noise that may be generated in a user's environment and the adjacent proximity. In other words, background noise may include any signal that can reach the user. Similarly, the user 122 is in an environment 134 that includes similar noise 136.

In this example, the user 102 may be communicating in the call 140 using a device 106 and the user 122 may be communicating in the call 140 using a device 126. The devices 106 and 126 may be smart phones, tablets, laptop computers, desktop computers, or other devices capable of participating in calls over a network 100.

In this example, a microphone array 104 may be present on or integrated into the device 106. Similarly, a microphone array 124 may be present on or integrated into the device 126. The arrays 104 and 124 may also be peripheral devices.

An intelligent microphone array 118, represented by microphones 108, 110, and 112, is also present and deployed in the environment 114. The array 118 may include any desired number of microphones that may be arranged in symmetric and/or asymmetric configurations. Different portions of the array 118 may have different microphone arrangements. The array 118 may also represent multiple distinct arrays. Each of the microphones 108, 110, and 112, for example, may represent a separate and independent array of microphones. The array 118 may connected to the device 106 in a wired or wireless manner. Similarly, the array 138, represented by the microphones 128, 130, and 132, is deployed in the environment 134.

The arrays 104, 118, 124, and 138 are configured to suppress local and/or remote noise such that the signals provided to the users 102 and 122 is a high-quality speech or audio signal. These arrays 104, 118, 124, and 138 are configured to reduce the level of localized and ambient noise signals including random noises, interfering or additional voices, environment reverberation, and the like. Further, the arrays 104, 118, 124, and 138 are associated with machine learning models and are able to adapt and learn to better reduce noise in an environment. Embodiments of the invention, described with respect to the users 102 and 122, may be applied to calls that include multiple users.

The array 118 is typically placed in the environment 114 around the user 102. The placement of the array 118 can be anywhere in the environment and does not need to be placed in a symmetric manner with respect to the user 102. For example, the array 118 can be to the left of the user, behind the user, or the like. The array 118 may be distributed symmetrically or non-symmetrically in the environment 114.

The array 118 (and/or the array 104) may be associated with or include a controller and or processing engine (e.g., see FIGS. 3 and 4) and with engine configured to process the sound detected by the microphones in the array 118. The array 104, which is integrated with the device 106 and which may be separate and independent of the array 118, may be associated with a separate engine to process the sound detected thereby.

The array 118 (or more specifically the controller or processing engine) may perform sound source localization, sound source extraction and noise suppression. The array 118 may include machine learning models or artificial intelligence configured to source noise, identify noise and generate anti-noise in real time. Thus, the noise 116 generated or sourced in the environment 114 is reduced or cancelled by the array 118.

In one example, when the array 118 is configured to suppress the noise 116, the array 118 may be configured with speakers that generate an anti-noise signal independent of any audio generated by the device 106 speakers.

More specifically, the array 118 receives or detects noise and generates a signal corresponding to the noise. This signal is processed (e.g., at the device 106 or other location) and an output is generated at speakers of the device 106 (or other speakers) to cancel the noise 116.

The array 104 may be configured to improve the speech of the user 102 transmitted to the user 122. Thus, the array 104 may perform dereverberation, echo cancellation, speech enhancement, and beamforming to improve the audio or speech of the user 102 transmitted over the network 100. The operations performed by the arrays 104 and 118 may be performed independently or jointly. The arrays 124 and 128 operate in a similar manner.

In one example, the audio heard by the user 102 and output by the device 106 (or other speakers in the environment 114) is a mix of audio from the user 122, which was improved at least by the arrays 124 and/or 138 and a signal generated to cancel the noise 116 by at least the array 118.

In one example, the array 118 operates to cancel the noise 116 in the environment 114. This allows the user 102 to better understand audio output from the device 106 that originated with the user 122, which audio was improved by at least the array 124.

Because the arrays 104, 118, 124, and 138 are associated with artificial intelligence or machine learning models, the arrays can be improved using both objective and subjective feedback. These feedback can be provided regularly or even continually in some instances.

Figure 1B:
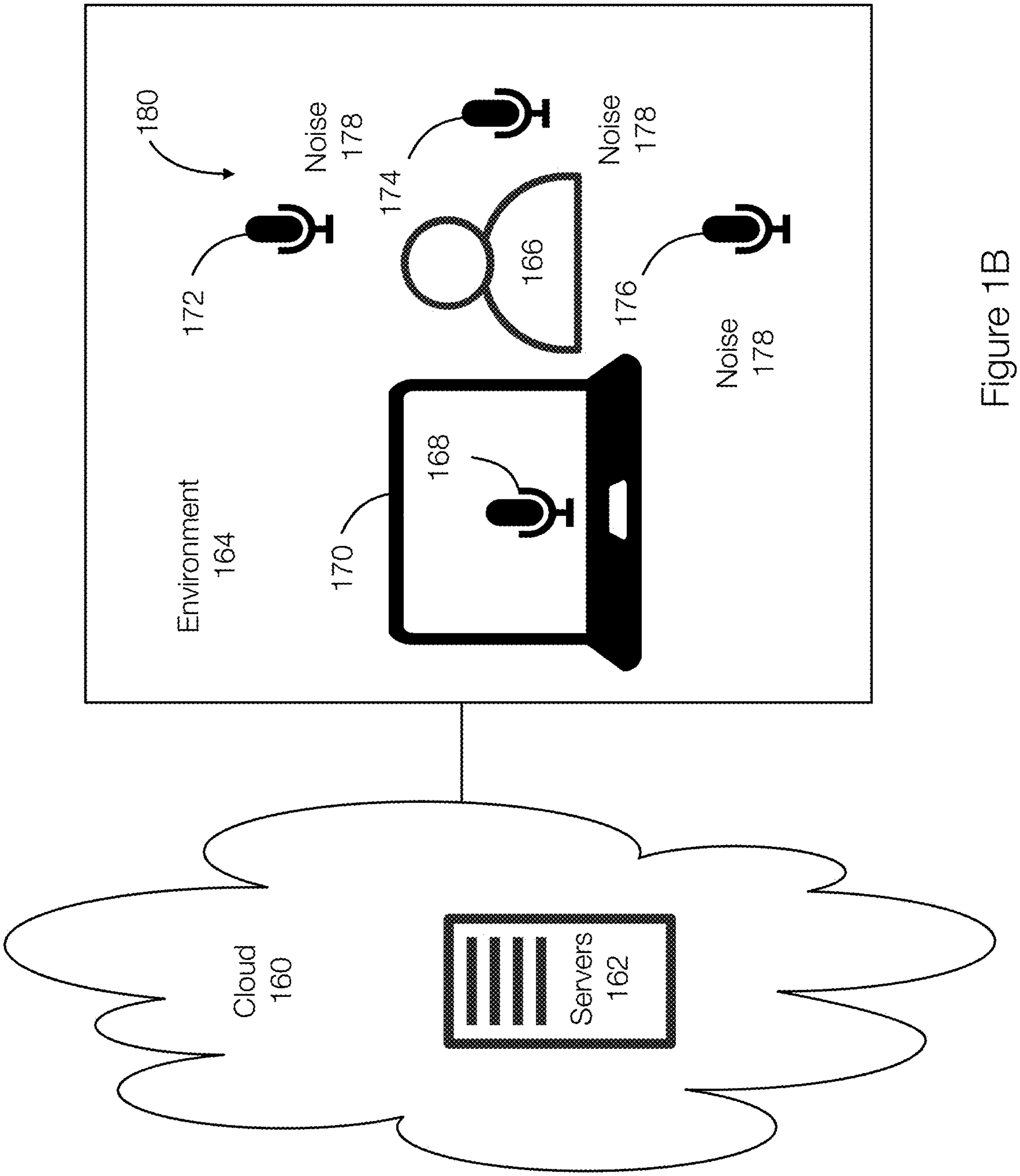
FIG. 1B discloses another example of a microphone array deployed in an environment and configured to suppress unwanted noise signals.

FIG. 1B illustrates an example of an environment in which sound quality operations may be performed. While FIG. 1A related, by way of example only, to conference calls, FIG. 1B illustrates that sound quality operations may be performed in a user's own environment.

In FIG. 1B, a user 166 may be associated with a device 170 that may include a microphone array 168. An array 180, which is represented by microphones 172, 174, and 176, may be present in an environment 164. The arrays 168 and 180 are similar to the arrays discussed with respect to FIG. 1A.

In this example, the arrays 168 and/or 180 may be configured to perform sound quality operations in the environment 164. Although the device 170 may be connected to the cloud 160 and may be accessing servers 162 (or other content), this is not required to perform sound quality operations in the environment 164. Further, the servers 162 (or server) may be implemented as an edge server, on the device 170, or the like. In fact, in one embodiment, the sound quality operations may be performed only with respect to the environment 164 (e.g., the device 170 need not be connected to the cloud 160 or other network).

The arrays 168 and 180 may be configured to cancel or suppress the noise 178 such that any audio played by the device 170 (or attached speakers) is more clearly heard by the user 166. Thus, the arrays 168 and 180 may generate an anti-noise signal that can be combined with any desired audio received and/or emitted by the device 170 such that the desired audio is clearly heard and the noise 178 is cancelled or suppressed. As discussed below, sound quality operations in the environment 164 are included in the following discussion.

Figure 2:
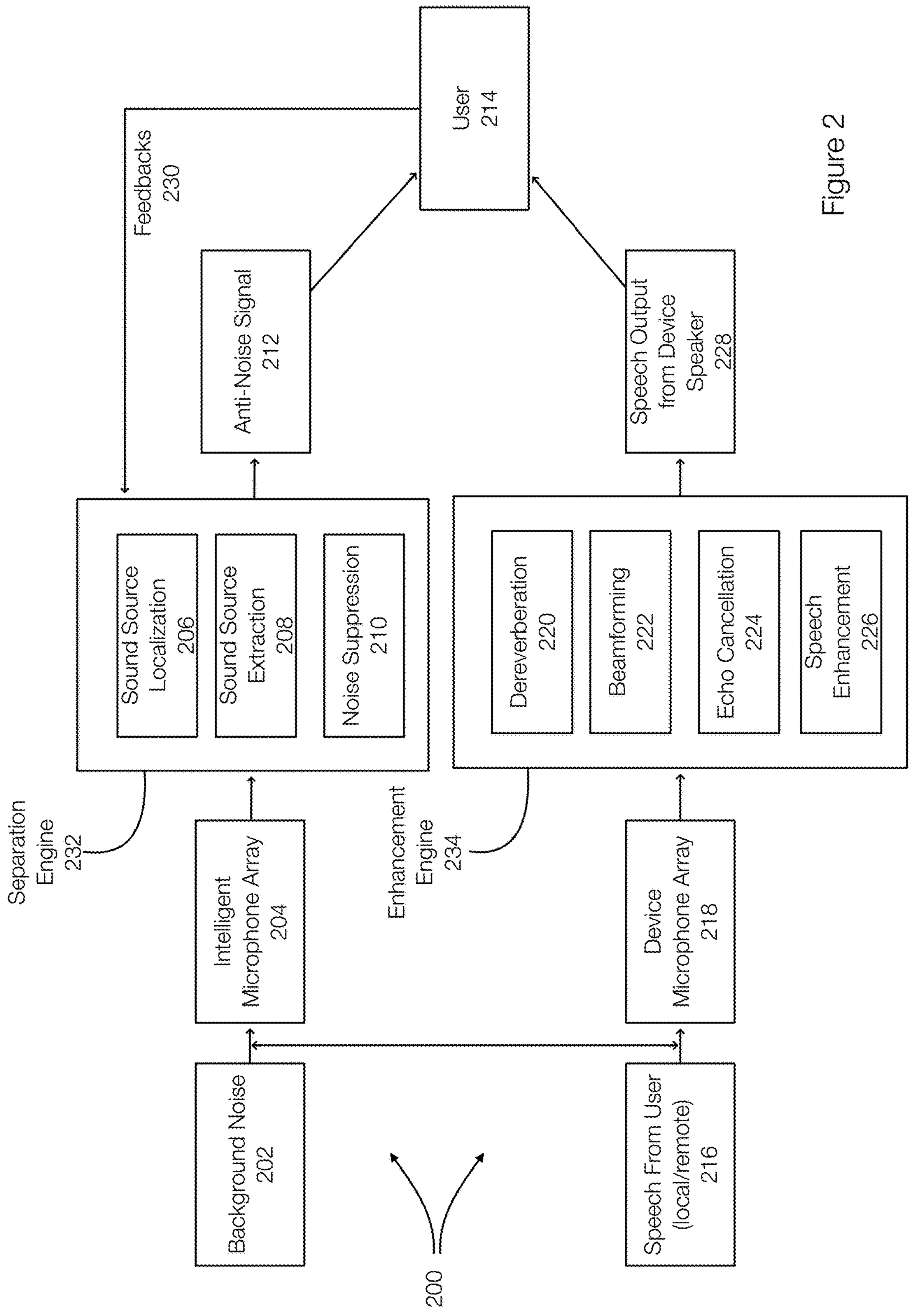
FIG. 2 discloses aspects of an architecture including microphone arrays for performing sound quality operations including noise suppression.

FIG. 2 illustrates an example of a system for performing sound quality operations. FIG. 2 illustrates a system 200 configured to perform sound quality operations such that sound or audio output to a user has good quality. The system 200 may be implemented by devices including computing devices, processors, or the like. FIG. 2 illustrates a separation engine 232 that is configured to at least process the background noise 202 and, in one example, separate noise and speech. In fact, embodiments of the invention can separate different types or categories of sound such as other voices, music, and the like. In one example, separating sound by category may allow different category specific suppression algorithms to be performed. For example, a machine learning model may learn to cancel other voices while another machine learning model may learn to cancel music or street noise.

Assuming that the desired audio is speech and all other audio is considered noise, by way of example only, embodiments of the invention operate to suppress the noise. Separating noise and speech allows the separation engine 232 to generate an anti-noise signal 212 that can reduce or cancel background noise 202 without impacting the user's speech and without impacting speech received from other users on the call (or, with respect to FIG. 1B, speech or desired audio (such as an online video or online music) that may be received from an online source). Thus, any background noise 202 that the user would otherwise hear is cancelled or reduced by the anti-noise signal 212, which may be played by the device speakers.

The microphone arrays illustrated in FIG. 1A can work together or independently. For example, the array 118 and the array 104 may both cooperate to enhance the audio signal transmitted over the network 100. Thus, the array 118 and the array 104 may, with respect to the speech of the user 102, perform functions to enhance the speech such as be removing noise, reverberation, echo, and the like. At the same time, the array 118 and 104 may also operate to suppress the noise 116 in the environment 114 such that the speech from the user 122, which was enhanced using the arrays 124 and/or 128 and which is output by the device 106, is easier for the user 102 to hear.

More specifically, the system 200 is configured to ensure that speech heard by a user has good quality. For a given user, embodiments of the invention may cancel the background noise in the given user's environment and output enhanced speech generated by remote users. Generating speech or audio for the given user may include processing signals that originate in different environments. As a result, the speech heard by the given user is enhanced.

In particular, the separation engine 232 is configured to perform sound source localization 206, sound source extraction 208, and noise suppression 210. The sound source localization 206 operates to determine where a sound originates. The sound source extraction 208 is configured to extract the noise from any speech that may be detected. The noise suppression 210 can cancel or suppress the noise without impacting the user's speech. For example, the sound source localization 206 may not cancel noise or speech that is sourced from the speakers of the user's device.

The separation engine 232 may include one or more machine learning models of different types. The machine learning model types may include one or more of classification, regression, generative modeling, DNN (Deep Neural Network), CNN (Convolutional Neural Network), FNN (Freeforward Neural Network), RNN (Recurrent Neural Network), reinforcement learning, or combination thereof. These models may be trained with datasets such as WaveNet denoising, SEGAN, EH Net, or the like.

In addition, data generated from actual calls or other usage such as in FIG. 1B can be recorded and used for machine model training. Also, the system 200 or the user 214 may provide feedbacks 230 to the separation engine 232. Objective feedback 230 may include evaluation metrics such as perceptual evaluation of speech quality, (PESQ), short-time objective intelligibility (STOI), frequency-weighted signal-noise ratio (SNR), or MOS. The user 214 may provide subjective feedback. For example, a user interface may allow the user 214 to specify the presence of echo, background noise, or other interference. In addition to standards and metrics, feedback may also include how the results relate to an average for a specific user or across multiple users.

The system 200 can compute the objective evaluation metrics, receive the subjective feedback, and compare the feedbacks with pre-set thresholds or requirements. Embodiments of the invention can be implemented without feedback or using one or more types of feedback. If the thresholds or requirements are not satisfied, optimizations are made until the requirements are satisfied.

During operation, the separation engine 232 may receive the noise signal from the intelligent microphone array 204. Features may be extracted from the noise signal. Example features include Mel-Frequency Cepstral Coefficients, Gammatone Frequency Cepstral Coefficient, Constant-Q spectrum, STFT magnitude spectrum. Logarithmic Power Spectrum, Amplitude, Harmonic Structure, and Onset (when a particular sound begins relative to others, etc.). Using these features, speech-noise separation is performed to extract a real time noise signal. This results in an anti-noise signal 212 or time-frequency mask that is added to the original background noise 202 signal to mask the noise for the user 214.

The system 200 may include an enhancement engine 234. In one embodiment, the enhancement engine 234 is configured to enhance the speech that is transmitted to other users. The input to the enhancement engine 234 may include a user's speech and background or environment noise. The enhancement engine 234 processes these inputs using machine learning models to enhance the speech. For example, the enhancement engine 234 may be configured to perform dereverberation 220 to remove reverberation, and echo cancellation 224. Beamforming 222 may be performed to focus on the user's speech signal. The speech is enhanced 226, in effect, by removing or suppressing these types of noise. The speech may be transmitted to the user 214 and output 228 from a speaker to the user 214.

Thus, the separation engine 232 uses the intelligent microphone array 204 and/or the device microphone array 218 to identify noise and generate anti-noise in real time in order to block the background noise from reaching the uses' ears. The enhancement engine 234 may use the intelligent microphone array 204 and the device microphone array 218 to perform machine learning based dereverberation, echo cancellation, speech enhancement and beamforming. These arrays, along with the arrays at other user environments, ensure that the speech heard by the users or participants of a call is high quality audio.

Returning to FIG. 1A, the ability to conduct calls that are satisfactory to all users includes the need to ensure that the communications have low latency. As latency increases, users become annoyed. By way of example only, latencies up to about 200 milliseconds are reasonably tolerated by users.

Latency is impacted by network conditions, compute requirements, and the code that is executed to perform the sound quality operations. Network latency is typically the largest. The introduction of machine learning models risks introducing excessive latencies in real-world deployments. As a result, embodiments of the invention may offload the workload. For example, the workload associated with the array 118 may be offloaded to a processing engine on the device 106 or on the servers 150, which may include edge servers. This allows latencies to be reduced or managed.

Figure 3:
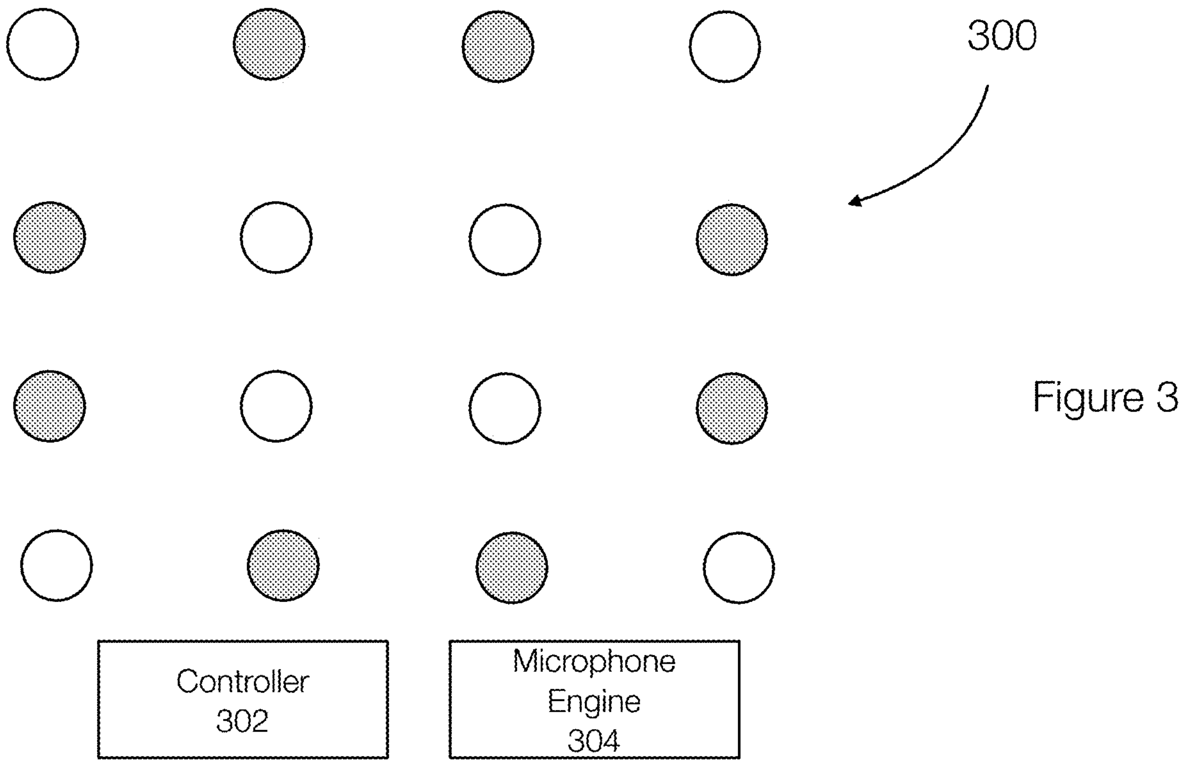
FIG. 3 discloses aspects of a microphone array with a circular microphone pattern.

FIG. 3 illustrates an example of microphone array. The array in FIG. 3 is an example of the array 118 in FIG. 1A. When deploying the array 118, embodiments of the invention may adaptively control which microphones are on and which are off. Thus, embodiments of the invention may operate using all of the microphones in an array or less than all of the microphones in the array.

Figure 4:
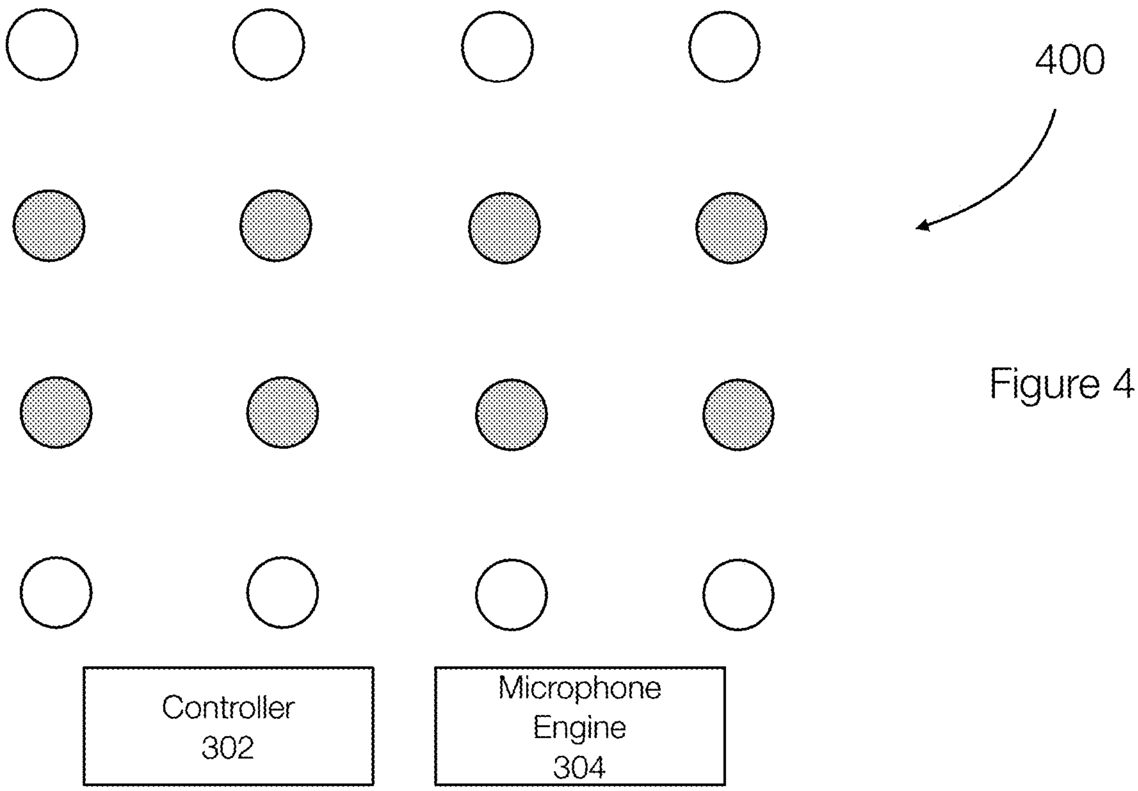
FIG. 4 discloses aspects of a microphone array with a rectangular microphone pattern.

FIG. 3 illustrates a specific pattern 300. In FIG. 3, the array is configured in a circular pattern 300. Thus, the grey microphones are turned on while the other microphones are turned off. FIG. 4 illustrates the array of FIG. 3 in another pattern. The pattern 400 shown in FIG. 4 is a rectangular pattern. The grey microphones are on while the others are off.

Depending on the size of the array, an array may be configured to include sufficient microphones to implement multiple patterns at the same time. In effect, a single array operates as multiple microphone arrays. This allows various sources of noises to be identified and processed by different array patterns in the microphone array. Alternatively, multiple arrays may be present in the environment and each array may be configured to process different noise categories or sources.

More generally, a microphone array is any number of microphones spaced apart from each other in a particular pattern. These microphones work together to produce an output signal or output signals. Each microphone is a sensor for receiving or sampling the spatial signal (e.g., the background noise). The outputs from each of the microphones can be processed based on spacing, patterns, number of microphones, types of microphones, and sound propagation principles. The arrays may be uniform (regular spacing) or irregular in form.

Embodiments of the invention may adaptively change the array pattern, use multiple patterns, or the like to perform sound quality operations. In one example, the array 118 and the array 104 may be controlled as a single array and may be adapted to perform sound quality operations.

The number and pattern/shape of the microphone array can be adaptively changed based on the noise sources detected. By continually assessing the spectral, temporal, level, and/or angular input characteristics of the user's communication environment, appropriate steering of features such as directions, shapes, and number of microphones can be performed to optimize noise suppression.

Embodiments of the invention may include pre-stored patterns that are effective for specific noise sources. For example, a two-microphone array pattern may be sufficient when only low-frequency background noise is detected and identified. If multiple voices are detected, a ring-shaped microphone array (e.g., using 8 microphones) may be formed based on the loudness, distance, and learned behaviors. If transient noise is detected, another pattern may be formed to automatically mask the transient noise. In a noisy background with many noise sources, the array may be separated into groups such that different noise sources can be cancelled simultaneously.

In one example, the microphone array may be associated with a controller 302 and/or a processing engine 304, which may be integrated or the same, that continually evaluate needs. The controller 302 can thus turn microphones on/off, wake/sleep microphones, or the like. The processing engine 304 may be implemented in a more powerful compute environment, such as the user's device or in the cloud. This allows the operations of the separation engine 232 and/or the enhancement engine 234 to be performed in a manner that reduces communication latencies while still providing a quality audio signal.

The ability to suppress noise often depends on the number of noise sources, the number of microphones and their arrangements, the noise level, the way source noise signals are mixed in the environment, prior information about the sources, microphones, and mixing parameters. These allow the system to continually learn and optimize.

Embodiments of the invention thus reduce background noise with improved speech. The user experience in a noisy environment is improved. Further, the speech is improved in an adaptive manner in real time using adaptive array configurations.

The array is configured to continuously detect the location and type of noise sources. This information is used to automatically switch between different modes, select an appropriate number of microphones, select an appropriate microphone pattern, or the like. Embodiments of the invention include machine learning models that can be improved with objective and subjective feedback. Further, processing loads can be offloaded to reduce the computational workload at the microphone arrays.

Figure 5:
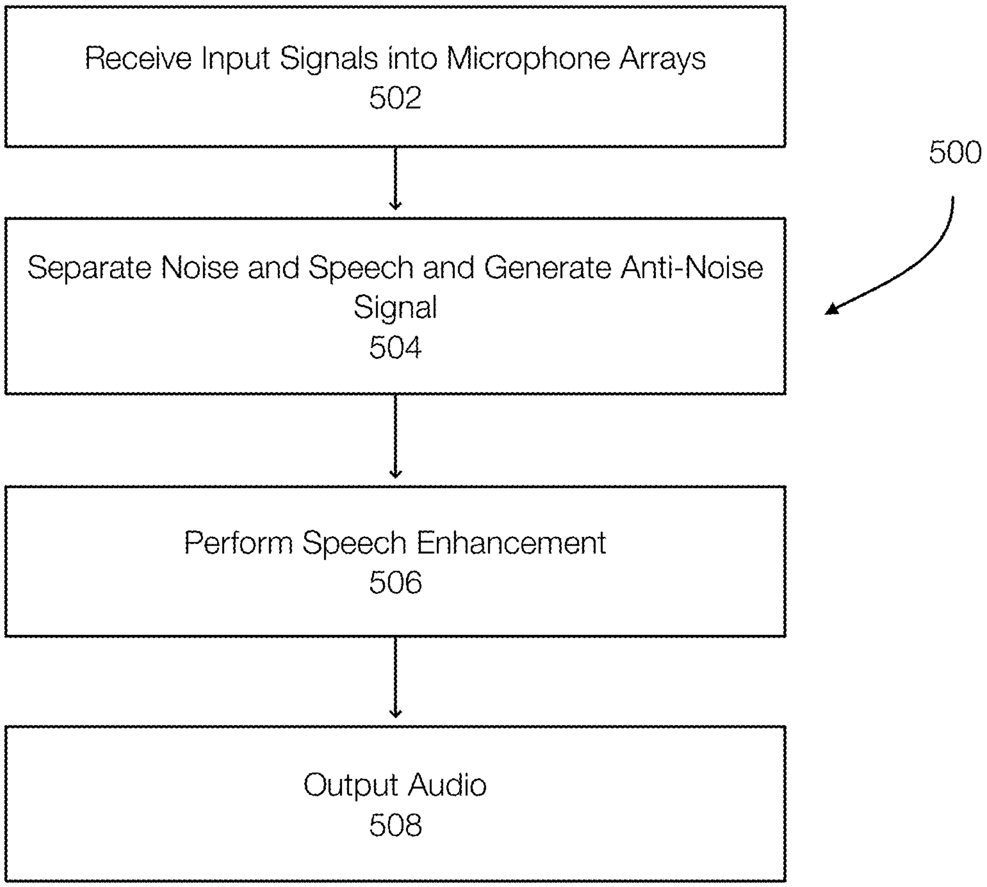
FIG. 5 discloses aspects of sound quality operations.

FIG. 5 discloses aspects of a methods for sound quality operations. A sound quality operation or method 500 allows the speech heard by a user to be more easily understood compared to a situation where embodiments of the invention are not performed.

Initially, audio (e.g., noise, speech) is received 502 as input into one or more microphone arrays. The arrays may be located in different environments (e.g., associated with different users). As previously stated, each of the users or participants in a call may be associated with one or more microphone arrays including a device microphone array and an intelligent microphone array. Each of the microphone arrays in each of the environments thus receives noise signals. Further, the noise signals are not typically the same in different environments.

Next, the input audio (signals received at the microphone arrays) is processed. For example, speech and noise in the audio signal may be separated 504 by a separation engine. This may include performing sound source localization, sound source extraction, and noise suppression. This may also include generating an anti-noise signal to cancel or suppress the noise that has been separated from the speech. This typically occurs at the environment in which speech is heard.

Speech enhancement is also performed 506. Speech enhancement may occur in different environments. For example, the speech of a first user that is transmitted to other users may be enhanced prior to or during transmission of the speech to other users by the enhancement engine.

Next, audio is output 508. At a user's device, the anti-noise signal and the enhanced speech received from other users are mixed and are output. This signal cancels or suppresses the noise in the user's environment and allows the user to hear the enhanced speech.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In general, embodiments of the invention may be implemented in connection with systems, devices, software, and components, that individually and/or collectively implement, and/or cause the implementation of, sound quality operations. More generally, the scope of the invention embraces any operating environment in which the disclosed concepts may be useful.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

Embodiments of the invention may comprise physical machines, virtual machines (VM), containers, or the like.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted with respect to the example method of Figure(s) XX that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method for performing a sound quality operation in a call, comprising: receiving a first input signal into at least a first microphone array, the input signal including background noise of a first environment, receiving a second input signal into at least a second microphone array, the second input signal comprising speech of a user, generating an anti-noise signal based on the first input signal, enhancing the speech of the second input signal to generate an enhanced speech signal, and mixing the anti-noise signal and the speech to produce an output signal, wherein the output signal that is heard by a recipient.

Embodiment 2. The method of embodiment 1, wherein the first microphone array comprises a plurality of microphones, the method further comprising adaptively setting microphone patterns in the first microphone array based one or more types or categories of the background noise.

Embodiment 3. The method of embodiment 1 and/or 2, further comprising determining the type or types of background noise and setting a pattern of microphones in the array for each of the types.

Embodiment 4. The method of embodiment 1, 2, and/or 3, further comprising performing, on the first input signal, sound source localization, sound source extraction, and noise suppression using a processing engine that comprises at least one machine learning model.

Embodiment 5. The method of embodiment 1, 2, 3, and/or 4, wherein the processing engine operates at a device or in an edge server.

Embodiment 6. The method of embodiment 1, 2, 3, 4, and/or 5, further comprising performing dereverberation, beamforming, and echo cancellation on the second input.

Embodiment 7. The method of embodiment 1, 2, 3, 4, 5, and/or 6, further comprising switching a mode of the first microphone array based on locations of the background noise and types of the background noise.

Embodiment 8. The method of embodiment 1, 2, 3, 4, 5, 6, and/or 7, further comprising generating objective feedback and subjective feedback configured to train machine learning models that operate to generate the anti-noise signal and the enhanced speech.

Embodiment 9. The method of embodiment 1, 2, 3, 4, 5, 6, 7, and/or 8, wherein each user in the call is associated with a first microphone array and a second microphone array, wherein speech heard by a first user is generated my mixing an anti-noise signal generated by the first microphone array associated with the first user and an enhanced speech signal generated by the second microphone associated with a second user remote from the first user.

Embodiment 10. The method of embodiment 1, 2, 3, 4, 5, 6, 7, 8, and/or 9, further comprising performing speech enhancement and generating the anti-noise signal using both the first and second microphone arrays.

Embodiment 11. A method for performing any of the operations, methods, or processes, or any portion of any of these, or any combination of these, disclosed herein.

Embodiment 12. A non-transitory storage medium having stored therein instructions that are executable by one or more hardware processors to perform operations comprising the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing a sound quality operation in a call, comprising:

receiving a first input signal into at least a first microphone array in a first environment, the input signal including background noise of the first environment, wherein the first microphone array incudes at least one pattern;

generating an anti-noise signal based on the first input signal;

receiving a second input signal into at least a second microphone array in the first environment, the second input signal comprising speech of a first user in the first environment;

enhancing the speech of the second input signal to generate an enhanced speech signal, wherein enhancing the speech is performed independently of generating the anti-noise signal; and mixing the anti-noise signal and the enhanced speech signal to produce an output signal, wherein the output signal is transmitted to a second environment, which is remote from the first environment, over a network and is output by speakers in the second environment and is heard by a second user in the second environment, wherein the output signal in the second environment is mixed with a second anti-noise signal configured to cancel noise in the second environment determined from a first microphone array in the second environment to improve audio heard by the second user in the second environment.

2. The method of claim 1, wherein the first microphone array comprises a plurality of microphones, the method further comprising adaptively setting microphone patterns in the first microphone array based on a type of the background noise.

3. The method of claim 2, further comprising determining the type or types of background noise and setting a pattern of microphones in the first microphone array for each of the types.

4. The method of claim 1, further comprising performing, on the first input signal, sound source localization, sound source extraction, and noise suppression using a processing engine that comprises at least one machine learning model.

5. The method of claim 4, wherein the processing engine operates at a device or in an edge server.

6. The method of claim 1, further comprising performing dereverberation, beamforming, and echo cancellation on the second input.

7. The method of claim 6, further comprising performing speech enhancement and generating the anti-noise signal using both the first and second microphone arrays.

8. The method of claim 1, further comprising switching at least one of the at least one pattern of the first microphone array based on locations of the background noise.

9. The method of claim 1, further comprising generating objective feedback and/or subjective feedback configured to train machine learning models that operate to generate the anti-noise signal and the enhanced speech.

10. The method of claim 1, wherein each user in the call is associated with a corresponding first microphone array and a corresponding second microphone array, wherein speech heard by each of the users is generated by mixing the anti-noise signal generated by the first microphone array associated with the first user in the first environment and the enhanced speech signal generated by the second microphone array associated with the first user for each of the other users.

11. A non-transitory storage medium having stored therein instructions that are executable by one or more hardware processors to perform operations comprising:

receiving a first input signal into at least a first microphone array in a first environment, the input signal including background noise of the first environment, wherein the first microphone array incudes at least one pattern;

generating an anti-noise signal based on the first input signal;

receiving a second input signal into at least a second microphone array in the first environment, the second input signal comprising speech of a first user in the first environment;

enhancing the speech of the second input signal to generate an enhanced speech signal, wherein enhancing the speech is performed independently of generating the anti-noise signal; and mixing the anti-noise signal and the enhanced speech signal to produce an output signal, wherein the output signal is transmitted to a second environment, which is remote from the first environment, over a network and is output by speakers in the second environment and is heard by a second user in the second environment, wherein the output signal in the second environment is mixed with a second anti-noise signal configured to cancel noise in the second environment determined from a first microphone array in the second environment to improve audio heard by the second user in the second environment.

12. The non-transitory storage medium of claim 11, wherein the first microphone array comprises a plurality of microphones, the method further comprising adaptively setting microphone patterns in the first microphone array based on a type of the background noise.

13. The non-transitory storage medium of claim 12, further comprising determining the type or types of background noise and setting a pattern of microphones in the first microphone array for each of the types.

14. The non-transitory storage medium of claim 11, further comprising performing, on the first input signal, sound source localization, sound source extraction, and noise suppression using a processing engine that comprises at least one machine learning model.

15. The non-transitory storage medium of claim 14, wherein the processing engine operates at a device or in an edge server.

16. The non-transitory storage medium of claim 11, further comprising performing dereverberation, beamforming, and echo cancellation on the second input and switching a pattern of the first microphone array based on locations of the background noise and types of the background noise.

17. The non-transitory storage medium of claim 11, further comprising generating objective feedback and/or subjective feedback configured to train machine learning models that operate to generate the anti-noise signal and the enhanced speech.

18. The non-transitory storage medium of claim 11, wherein each user in the call is associated with a corresponding first microphone array and a corresponding second microphone array, wherein speech heard by each of the users is generated by mixing the anti-noise signal generated by the first microphone array associated with the first user in the first environment and the enhanced speech signal generated by the second microphone array associated with the first user for each of the other users.

19. The non-transitory storage medium of claim 11, further comprising performing speech enhancement and generating the anti-noise signal using both the first and second microphone arrays.

* * * * *